United States Patent
Huang

(10) Patent No.: US 9,626,546 B2
(45) Date of Patent: Apr. 18, 2017

(54) ELECTRONIC DEVICE AND CONTROL METHOD THEREOF

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Ren-Wen Huang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

(*) Notice: Subject to any disclaimer, the term of this patent is extended or adjusted under 35 U.S.C. 154(b) by 23 days.

(21) Appl. No.: 14/717,395

(22) Filed: May 20, 2015

(65) Prior Publication Data

US 2016/0117540 A1  Apr. 28, 2016

(30) Foreign Application Priority Data

Oct. 28, 2014  (CN) .......................... 2014 1 0585767

(51) Int. Cl.
```
G06K 9/00      (2006.01)
G06F 3/0488    (2013.01)
G06F 21/00     (2013.01)
```
(52) U.S. Cl.
CPC ......... *G06K 9/0002* (2013.01); *G06F 3/0488* (2013.01); *G06F 21/00* (2013.01); *G06K 9/00013* (2013.01)

(58) Field of Classification Search
CPC ........ G06F 3/0488; G06F 21/45; G06F 3/041; G06F 21/00; G06K 9/0002; G06T 7/602
See application file for complete search history.

(56) References Cited

U.S. PATENT DOCUMENTS

| | | | | |
|---|---|---|---|---|
| 2006/0170658 A1* | 8/2006 | Nakamura | ............ | G06F 3/0412 345/173 |
| 2009/0264159 A1* | 10/2009 | Hsieh | ...................... | H04M 1/67 455/566 |
| 2010/0171753 A1* | 7/2010 | Kwon | .................... | G06F 1/3218 345/593 |
| 2012/0229519 A1* | 9/2012 | Stallings | .............. | G06F 3/04886 345/661 |
| 2013/0271413 A1* | 10/2013 | Shibuya | ................... | G06F 3/044 345/173 |
| 2014/0210728 A1* | 7/2014 | Busse | .................... | G06F 9/4443 345/173 |
| 2014/0309789 A1* | 10/2014 | Ricci | ........................ | B60Q 1/00 700/276 |

(Continued)

*Primary Examiner* — Jingge Wu
(74) *Attorney, Agent, or Firm* — Zhigang Ma

(57) ABSTRACT

A method for controlling an electronic device is provided. The electronic device has a child mode and an adult mode. The method includes capturing a touch image of a finger contacting with a touch screen when a touch operation is applied to unlock the touch screen. An area value of a touch image of the finger contacting with the touch screen is calculated based on the captured touch image and compared with one or more predefined area values. The user is determined to be a child or an adult according to the comparison result. The electronic device is controlled to alternatively enter the adult mode or the child mode based on the determination result.

12 Claims, 3 Drawing Sheets

(56) References Cited

U.S. PATENT DOCUMENTS

| | | | |
|---|---|---|---|
| 2014/0309864 A1* | 10/2014 | Ricci | H04W 48/04 701/36 |
| 2015/0033162 A1* | 1/2015 | Hiro | H04M 1/72583 715/765 |
| 2015/0160779 A1* | 6/2015 | Huang | G06F 3/0418 345/174 |
| 2015/0160794 A1* | 6/2015 | Huang | G06F 3/0482 715/810 |
| 2015/0229757 A1* | 8/2015 | Chai | G06F 3/04883 455/411 |

* cited by examiner

ELECTRONIC DEVICE AND CONTROL METHOD THEREOF

CROSS-REFERENCE TO RELATED APPLICATIONS

This application claims priority to Chinese Patent Application No. 201410585767.5 filed on Oct. 28, 2014, the contents of which are incorporated by reference herein.

FIELD

The subject matter herein generally relates to electronic devices, and more specifically relates to an electronic device and a method for controlling the electronic device.

BACKGROUND

Many types of devices, such as mobile phones, tablets, and personal digital assistants are increasingly used for entertainment and learning, as younger children often use devices to play games, take pictures, listen to music, and other activities. A method should be provided for different users to control the devices, which allows right to access of the correct applications for each user of the device.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
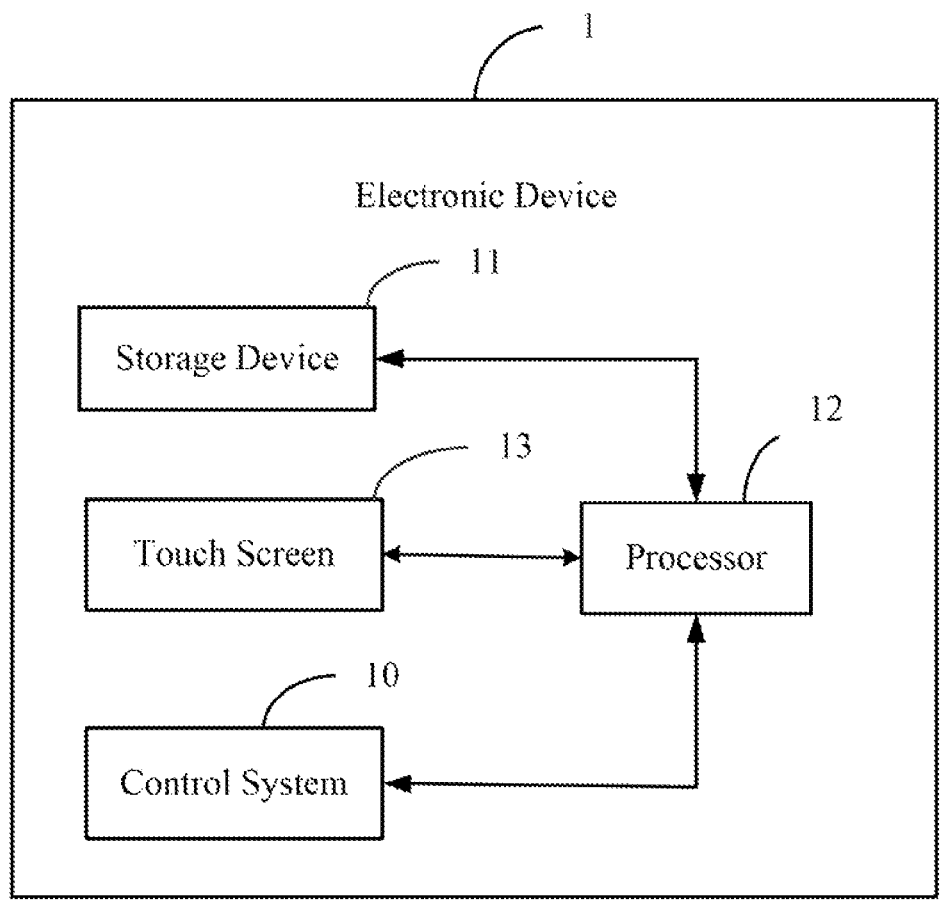
FIG. 1 is a block diagram of one embodiment of a hardware environment for executing a control system.

It will be appreciated that for simplicity and clarity of illustration, where appropriate, reference numerals have been repeated among the different fingers to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the word "module," as used hereinafter, refers to logic embodied in hardware or firmware, or to a collection of software instructions, written in a programming language, such as, for example, Java, C, or assembly. One or more software instructions in the modules may be embedded in firmware. It will be appreciated that modules may comprise connected logic units, such as gates and flip-flops, and may comprise programmable units, such as programmable gate arrays or processors. The modules described herein may be implemented as either software and/or hardware modules and may be stored in any type of non-transitory computer-readable storage medium or other computer storage device. The term "comprising," when utilized, means "including, but not necessarily limited to"; it specifically indicates open-ended inclusion or membership in the so-described combination, group, series and the like.

FIG. 1 is a block diagram of one embodiment of a hardware environment for executing a control system. The control system 10 is installed and runs in an apparatus, for example an electronic device 1. In at least one embodiment as shown in FIG. 1, the electronic device 1 includes, but is not limited to, a storage device 11, at least one processor 12, and a touch screen 13. The electronic device 1 can be a tablet computer, a notebook computer, a smart phone, a personal digital assistant (PDA), or another suitable electronic device. FIG. 1 illustrates only one example of the electronic device that can include more or fewer components than illustrated, or have a different configuration of the various components in other embodiments.

The control system 10 can capture a touch image of a finger contacting with the touch screen when a user applies an operation on the touch screen to unlock the electronic device 1 and calculate an area value of the captured touch image. The calculated area value of the captured touch images is compared with predefined values. If it is determined that the user is an adult the electronic device 1 is controlled to enter an adult mode or if it is determined that the user is a child the electronic device 1 is controlled to enter a child mode, according to the compared result after the electronic device 1 is unlocked.

In at least one embodiment, the storage device 11 can include various types of non-transitory computer-readable storage mediums. For example, the storage device 11 can be an internal storage system, such as a flash memory, a random access memory (RAM) for temporary storage of information, and/or a read-only memory (ROM) for permanent storage of information. The storage device 11 can also be an external storage system, such as a hard disk, a storage card, or a data storage medium. The at least one processor 12 can be a central processing unit (CPU), a control module, or other data processor chip that performs functions of the control system 10 in the electronic device 1. The touch screen 13 can display images and videos. In the embodiment, the touch screen 13 can display at least one application implemented by the electronic device 1 and receive operation commands.

Figure 2:
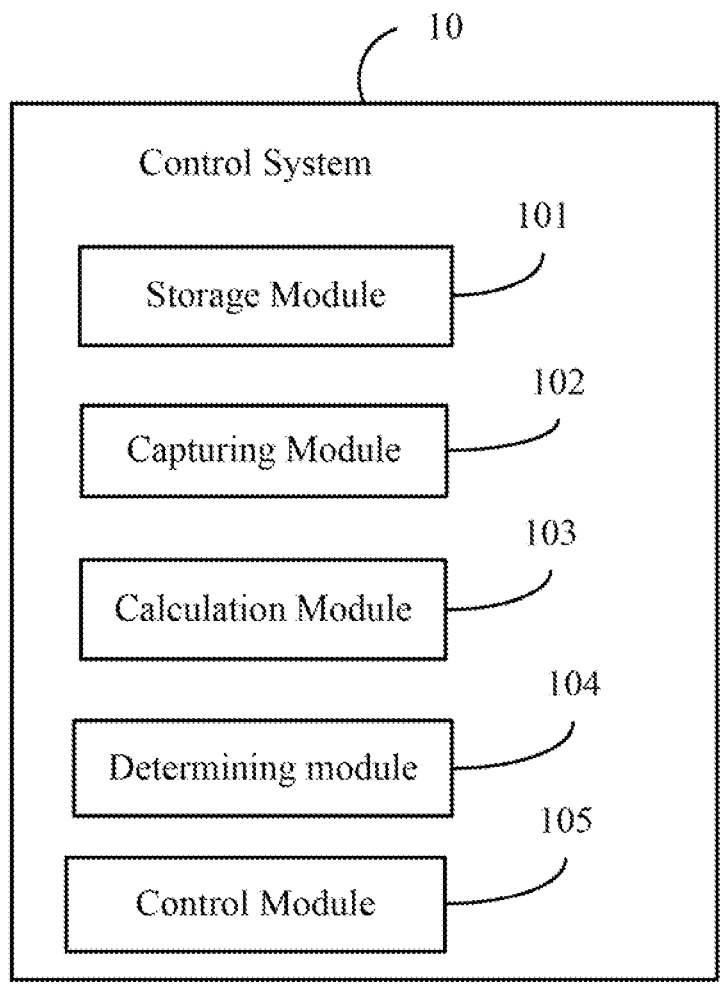
FIG. 2 is a block diagram of one embodiment of function modules of the control system in FIG. 1.

FIG. 2 is a block diagram of one embodiment of the function modules of the control system 10. In at least one embodiment, the control system 10 can include a storage module 101, a capturing module 102, a calculation module 103, a determining module 104, and a control module 105. The function modules 101-105 can include computerized codes in the form of one or more programs, which are stored in the storage device 11. The at least one processor 12 executes the computerized codes to carry out functions of the function modules 101-105.

The storage module 101 can store predefined area values of touch areas associated with operations applied on the touch screen 13 when the electronic device 1 is locked. In a first embodiment, only a first area value A is predefined and stored by the storage module 101. In a second embodiment, a first area value A and a second area value B are predefined and stored by the storage module 101, and the first area value A is larger than the second area value B(A>B). In a third embodiment, a first area value A, a second area value B, and a parameter C are predefined and stored by the storage module 101. The first area value A is larger than the second area value B, and $A*(1-C)$ is larger than $B*(1+C)(A*(1-C)>B*(1+C))$, the value of the parameter C is between 0 and $1(0<C<1)$. In the embodiment, the parameter C equals to 0.1 (C=0.1), the first area value A is predefined to equal an area value of a touch image when an adult touches the touch screen 13, the second area value B is predefined to equal an area value of a touch image when a child touches the touch screen 13.

The storage module 101 further stores a predefined adult mode and a predefined child mode. In the adult mode, a user can access all functions of a normal electronic device. For example, the adult can access, modify, delete and remove files stored in the electronic device 1, install, delete or update applications on the electronic device 1 when the electronic device 1 is in adult mode. In the child mode, some functions of the electronic device are prevented from being used. For example, a child can access various files stored in the electronic device 1, and cannot install, delete or update applications on the electronic device 1 when the electronic device 1 is in child mode.

In an alternative embodiment, in child mode, some functions of the electronic device 1 are prevented from being used under preset time periods. For example, a child is allowed to use the electronic device 1 to read an e-book only at 8-9 AM each day, and play a game for half an hour only at 9-10 AM each day. In another embodiment, in the child mode, some functions of the electronic device 1 are prevented from being used under some particular situations. For example, a child is allowed to phone his or her parents via the electronic device 1 when at school. A child is allowed to use the GPS and not to read e-books, play games, or watch videos when walking When the light is bad, the electronic device 1 allows music to be played and not allow videos or games to be played.

The capturing module 102 can capture a touch image of a finger contacting with the touch screen 13 when a user uses a finger to apply a touch operation to unlock the electronic device 1. The touch operation can be a press operation or a sliding operation. In the embodiment, the capturing module 102 captures the touch image of the finger contacting the touch screen 13. In an alternative embodiment, the capturing module 102 captures the touch image when the finger touches the touch screen 13 for a predefined time such as 10 seconds.

The calculation module 103 can process the touch image captured by the capturing module 102 and calculate an area value of the captured touch image. In the embodiment, the calculation module 103 can count pixels of the captured touch image and get the area value of the touch image that contacts with the touch screen 13 according to the pixels of the touch images.

The determining module 104 can compare the calculated area value of the touch image with the predefined area values of the touch image and determine a type of the user according to the comparison result.

In a first embodiment, when the calculated area value of the touch image is larger than the first predefined area value A, the determining module 104 determines the user is an adult; when the area value of the touch image is smaller than the first predefined area value A, the determining module 104 determines the user is a child. In a second embodiment, when the area value of the touch image is larger than the first predefined area value A, the determining module 104 determines the user is an adult; when the area value of the touch image is smaller than the second predefined area value B, the determining module 104 determines the user is a child. In a third embodiment, when the area value of the touch image is larger than $A*(1-C)$ and further smaller than $A*(1+C)$, the determining module 104 determines the user is an adult; when the area value of the touch image is larger than $B*(1-C)$ and further smaller than $B*(1+C)$, the determining module 104 determines the user is a child.

The control module 105 can control the electronic device 1 to enter adult mode or child mode according to the determining result when the electronic device 1 is unlocked.

In the embodiment, when the determining module 104 determines the user is an adult, the control module 105 controls the electronic device 1 to enter the adult mode when the electronic device 1 is unlocked. When the determining module 104 determines the user is a child, the control module 105 controls the electronic device 1 to enter the child mode when the electronic device 1 is unlocked.

In other embodiments, the control module 105 can further update the functions of the electronic device 1 prevented from being used in the child mode in response to operations of an adult. For example, the control module 105 updates the functions to allow a child to remove, delete or modify some files, access limited internet source via browser, watch videos, install or update some applications on the electronic device 1, in response to operations of an adult.

Figure 3:
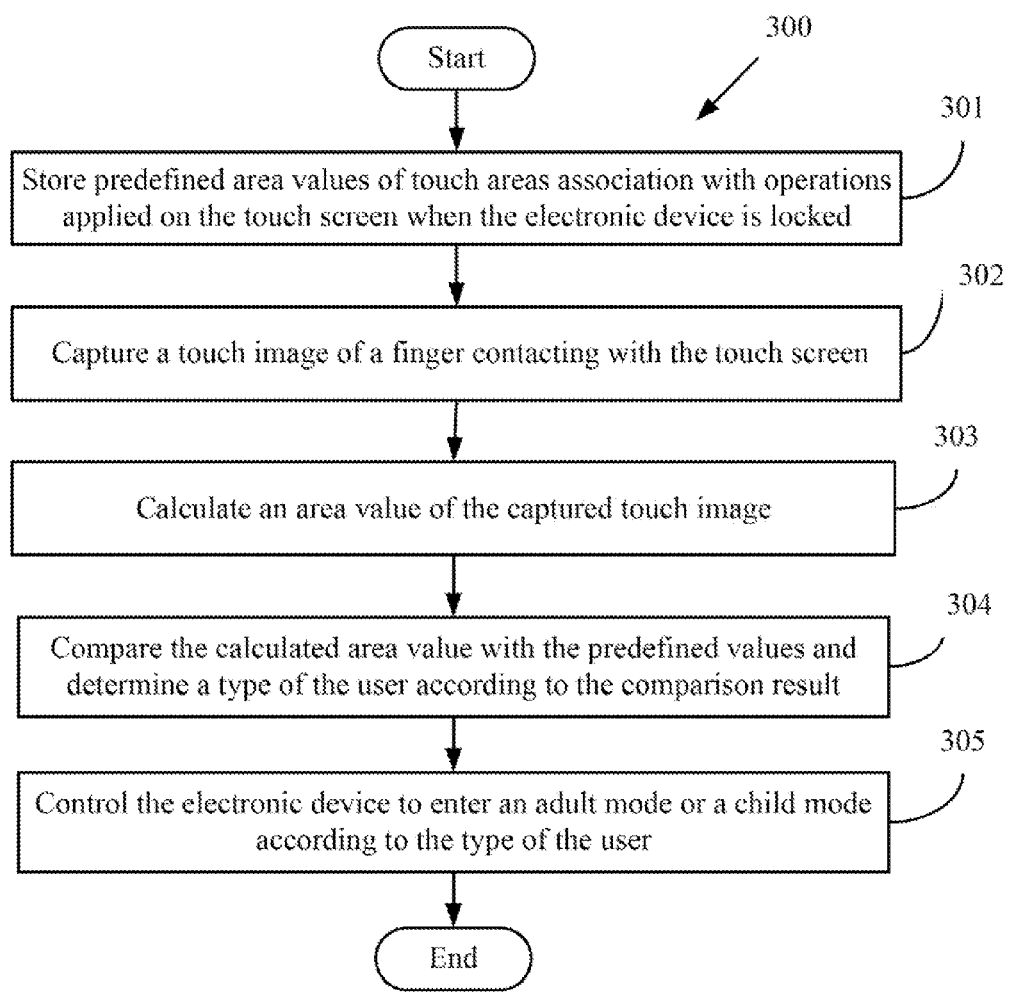
FIG. 3 is a flowchart of one embodiment of a control method.

FIG. 3 illustrates a flowchart of a control method in accordance with an example embodiment. The example method 300 is provided by way of example, as there are a variety of ways to carry out the method. The method 300 described below can be carried out using the configurations illustrated in FIGS. 1 and 2, for example, and various elements of these figures are referenced in explaining example method 300. Each block shown in FIG. 3 represents one or more processes, methods or subroutines, carried out in the exemplary method 300. Additionally, the illustrated order of blocks is by example only and the order of the blocks can change according to the present disclosure. The exemplary method 300 can begin at block 301. Depending on the embodiment, additional steps can be added, others removed, and the ordering of the steps can be changed. For example, the method can also begin at block 302.

At block 301, the storage module stores predefined area values of touch areas associated with touch operations applied on the touch screen to unlock the electronic device.

The storage module further stores a predefined child mode and a predefined adult mode.

At block 302, the capturing module captures a touch image of a finger contacting with the touch screen when a user applies a touch operation to unlock the electronic device via the finger.

At block 303, the calculation module calculates an area value of the captured touch image.

At block 304, the determining module compares the calculated area value of the captured touch image with the predefined area values of the touch image and determines a type of the user according to the comparison result.

At block 305, the control module controls the electronic device to enter an adult mode or a child mode according to the type of the user detected when the electronic device is unlocked.

When the determining module determines the user is an adult, the control module controls the electronic device to enter the adult mode after the electronic device is unlocked. When the determining module determines the user is a child, the control module controls the electronic device to enter the child mode after the electronic device is unlocked.

In an alternative embodiment, the control module updates the functions prevented from being used in the child mode in response to operations of an adult.

The embodiments shown and described above are only examples. Many details are often found in the art. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A method for controlling an electronic device having a child mode and an adult mode, the method executable by at least one processor of the electronic device, the method comprising:
    capturing a touch image of a finger contacting with a touch screen when a touch operation is applied to unlock the touch screen;
    calculating an area value of the captured touch image;
    comparing the calculated area value of the captured touch image with one or more predefined values to determine a comparison result;
    determining a type of user according to the comparison result, wherein a first area value A, a second area value B, and a parameter C are predefined, wherein the value of the parameter C is between 0 and 1, and $A*(1-C)>B*(1+C)$; when the calculated area value of the touch image is larger than $A*(1-C)$ and smaller than $A*(1+C)$, the user is determined to be an adult; when the calculated area value of the touch image is larger than $B*(1-C)$ and smaller than $B*(1+C)$, the user is determined to be a child; and
    controlling the electronic device to alternatively enter the adult mode or the child mode according to the type of the user.

2. The method according to claim 1, further comprising: controlling the electronic device to enter the adult mode when the user is determined to be an adult; and controlling the electronic device to enter the child mode when the user is determined to be a child.

3. The method according to claim 1, further comprising updating functions prevented from being useable in the child mode in response to operations of an adult.

4. The method according to claim 3, wherein the functions prevented from being used are associated with time periods.

5. The method according to claim 1, further comprising storing predefined area values of touch areas association with touch operations applied on the touch screen to unlock the electronic device.

6. An electronic device providing dual modes comprising a child mode and an adult mode, the electronic device comprising:
    a touch screen configured to receive touch operation commands and display at least one application implemented in the child mode and the adult mode;
    at least one processor; and
    a storage device that stores one or more programs which, when executed by the at least one processor, cause the at least one processor to:
    capture a touch image of a finger contacting with a touch screen when the finger applies a touch operation to unlock the touch screen;
    calculate an area value of the touch image of the finger contacting with the touch screen based on the captured touch image;
    compare the calculated area value of the touch image with predefined values to determine a comparison result;
    determine a type of user according to the comparison result, wherein a first area value A, a second area value B, and a parameter C are predefined, wherein the value of the parameter C is between 0 and 1, and $A*(1-C)>B*(1+C)$; when the area value of the touch image is larger than $A*(1-C)$ and smaller than $A*(1+C)$, the user is determined to be an adult; when the area value of the touch image is larger than $B*(1-C)$ and smaller than $B*(1+C)$, the user is determined to be a child; and
    control the electronic device to alternatively enter an adult mode or a child mode according to the type of the user after the electronic device is unlocked.

7. The electronic device according to claim 6, wherein when the user is determined to be an adult, the electronic device enters the adult mode; when the user is determined to be a child, the electronic device enters the child mode.

8. The electronic device according to claim 6, wherein functions of the electronic device are prevented from being usable when the electronic device enters the child mode.

9. The electronic device according to claim 8, wherein the prevented functions of the electronic device comprise removing, detecting or modifying files, watching videos and accessing an internet source through a browser, or installing or updating applications.

10. The electronic device according to claim 8, wherein the prevented functions of the electronic device further associate with time periods.

11. A non-transitory storage medium having stored thereon instructions that, when executed by a processor of an electronic device, which provides dual modes comprising a child mode and an adult mode, causes the processor to perform a control method, wherein the control method comprises:
    capturing a touch image of a finger contacting with a touch screen when a touch operation is applied to unlock the touch screen;
    calculating an area value of the captured touch image;
    comparing the calculated area value of the captured touch image with one or more predefined values;
    determining a type of the user according to the comparison result, wherein a first area value A, a second area value B and a parameter C are predefined, the first area value A is larger than the second area value B, value of the parameter C is between 0 and 1, and $A*(1-C)>B*(1+C)$; when the area value of the touch image is larger than A*(1−C) and further smaller than A*(1+C), the user is determined to be an adult; when the area value of the touch image is larger than B*(1 −C) and further smaller than B*(1+C), the user is determined to be a child; and controlling the electronic device to alternatively enter an adult mode or a child mode according to the type of the user after the electronic device is unlocked.

12. The non-transitory storage medium according to claim 11, further comprising: controlling the electronic device to enter the adult mode when the user is determined to be an adult; and controlling the electronic device to enter the child mode when the user is determined to be a child.

* * * * *